United States Patent [19]

Bornmann

[11] Patent Number: 5,108,348
[45] Date of Patent: Apr. 28, 1992

[54] RATIO CONTROL FOR A CONTINUOUSLY VARIABLE TRANSMISSION

[75] Inventor: Guenter Bornmann, Cologne, Fed. Rep. of Germany

[73] Assignee: Ford Motor Company, Dearborn, Mich.

[21] Appl. No.: 596,164

[22] Filed: Oct. 11, 1990

[30] Foreign Application Priority Data

Oct. 16, 1989 [DE] Fed. Rep. of Germany ....... 3934506

[51] Int. Cl.$^5$ .............................................. F16H 59/00
[52] U.S. Cl. ........................................ 474/18; 474/28
[58] Field of Search ................................... 474/28, 18; 74/867-869

[56] References Cited

U.S. PATENT DOCUMENTS

| 4,767,384 | 8/1988 | Moan | 474/28 |
| 4,938,101 | 7/1990 | Maki et al. | 74/867 |
| 4,944,201 | 7/1990 | Iino et al. | 74/868 |
| 4,949,596 | 8/1990 | Iino et al. | 74/868 |

Primary Examiner—Ramon S. Britts
Assistant Examiner—Roger J. Schoeppel
Attorney, Agent, or Firm—Frank G. McKenzie; Keith L. Zerschling

[57] ABSTRACT

A transmission ratio control device for a controllable, continually variable V-belt transmission for motor vehicles includes a primary hydraulic line carrying the clamping pressure for the V-belt from the primary pressure chamber, a check valve opening against the pressure in the primary pressure chamber, a secondary hydraulic line carrying the clamping pressure for the V-belt from the secondary pressure chamber, and a second check valve opening against the pressure in the secondary pressure chamber. An adjustable pump is installed in a line connecting the first line, between the primary pressure chamber and the first check valve, to the second line, between the secondary pressure chamber and the secondary check valve. The adjustable pump is dependent on a control signal to control the continually variable gear ratio by pumping hydraulic fluid between the primary pressure chamber and the secondary pressure chamber.

9 Claims, 7 Drawing Sheets

RATIO CONTROL FOR A CONTINUOUSLY VARIABLE TRANSMISSION

BACKGROUND OF THE INVENTION

1. Field of the Invention

This invention relates to the field of automatic transmissions. More particularly, it deals with transmissions that produce a stepless, variable range of speed ratio by changing automatically the relative size of pulleys connected by an endless drive belt. The invention pertains to a system for controlling the speed ratio of such a transmission.

2. Description of the Prior Art

U.S. Pat. No. 4,767,384 discloses a system for controlling a stepless conical disc transmission having a primary input shaft driven by an engine or motor and a secondary output shaft driven by an endless drive belt. Conical disc assemblies, one located on the primary shaft and one on the secondary shaft, each includes a cylinder in which a piston, connected integrally to a conical disc of the respective disc assembly, moves within the respective cylinder to form a pressure chamber. The two pressure chambers are charged with high pressure to apply the necessary application pressure that develops between the conical discs and the drive belt on both the primary side and the secondary side.

To address the transmission ratio, two additional pressure chambers are located between the two conical disc members on the primary shaft. These two pressure chambers are separated mutually by a piston connected to one conical disc member so that the two conical discs are adjusted axially with respect to one another in accordance with the pressure within the two additional pressure chambers.

In the control system of the '384 patent, relatively low pressure produced by a pump to adjust the transmission ratio, i.e., to pressurize the two additional pressure chambers, is applied selectively to another pressure chamber. This low pressure can be substantially lower than the pressure used to maintain contact pressure between the drive belt and the conical pulley. The system of the '384 patent avoids the problem in continually variable transmissions of producing high pressure to maintain contact between the drive belt and the pulleys, for which a low displacement pump may be sufficient and high flow rate when adjusting the transmission ratio, and producing only moderately high pressure at other times. In the conventional method for supplying pressure through operation of one pump only, high volume flow at high pressure is supplied, although high flow rate is required only in extreme cases. In this way, a large percentage of the energy required to produce hydraulic power is converted continuously to useless heat. A further disadvantage of such systems is the need for three pressure chambers to produce contact pressure and to alter the transmission ratio. Furthermore, the need for three pressure chambers pressurized to different magnitudes is relatively expensive and complicated.

To adjust transmission ratio and to produce contact pressure dependent on torque, the system of the '384 patent requires that the pressures within the pressure cylinders be made unequal following an initial application of pressure of equal magnitude to the cylinders. This imbalance is required so that pressure in the cylinder with the lower pressure is monitored by an application pressure system, and the pressure in the other cylinder is increased by an additional increment.

SUMMARY OF THE INVENTION

It is an object of the present invention to provide a system for adjusting the transmission ratio of a stepless continuously variable transmission and maintaining driving contact between the conical pulleys and the drive belt. Pressure for adjusting the transmission ratio in accordance with the present invention is produced relatively simply. In realizing these objectives, a system for controlling the transmission ratio of a continuously variable transmission according to the present invention includes a first non-return valve, open to pressure in a primary-side pressure chamber, located in a first hydraulic line. A second check valve, open to the pressure in a secondary-side pressure chamber, is located in a second line. A variable displacement pump moves fluid between the primary-side pressure chamber to the secondary-side pressure chamber as a function of a control signal representing transmission ratio control. The pump has variable flow rate capacity and is located in a line connecting the primary-side pressure chamber and first check valve to the secondary-side pressure chamber and second check valve.

An advantage of the system of the present invention is that only one pressure chamber is required to produce contact pressure and to adjust transmission ratio on the primary side and secondary side, respectively. In order to produce transmission ratio changes, fluid is pumped from the pressure chamber on the primary shaft into the pressure chamber on the secondary shaft and in the opposite direction by a variable displacement pump. Such a variable displacement pump steplessly changes fluid flow between negative and positive extreme magnitudes as a function of a control signal. The combination of a gear pump, driven by an engine and delivering a fluid stream proportional to the pump speed in only one flow direction, and a valve operate together to effect flow reversal and pressure regulation in response to a control signal.

BRIEF DESCRIPTION OF THE DRAWINGS

The invention and embodiments of the present invention are described in more detail hereinafter with reference to the drawings.

DESCRIPTION OF THE PREFERRED EMBODIMENTS

Figure 1:
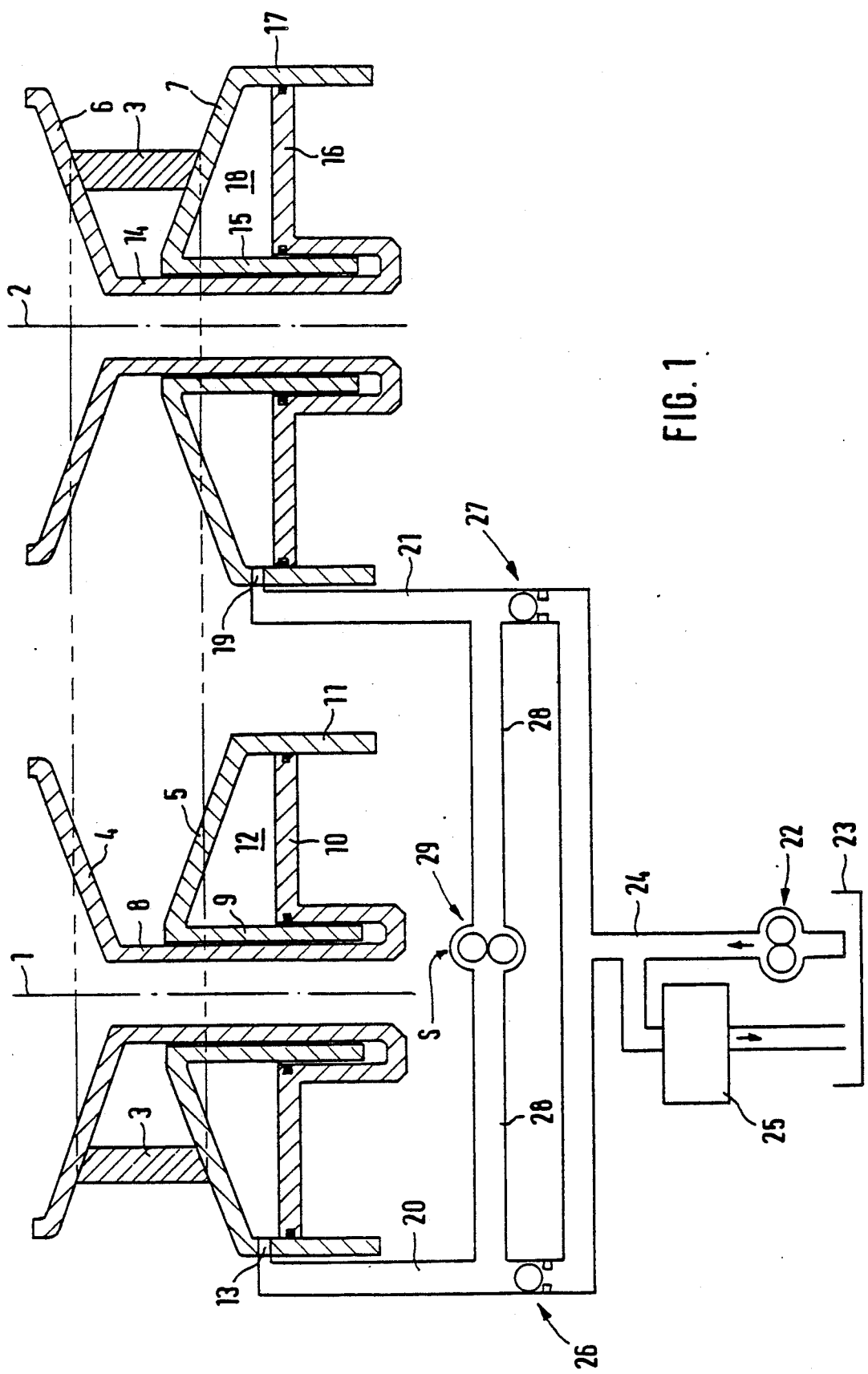
FIG. 1 is a schematic view of a system according to the present invention.

Referring first to FIG. 1, in a stepless continuously variable transmission the axis of a driving shaft 1 and the axis of a driven shaft 2 are arranged substantially parallel. Shaft 1, the primary shaft, supports first conical disc 4 and second conical disc 5, between which an endless tension drive belt 3 is located. The drive belt is located similarly on driven shaft 2 between a third conical disc 6 and a fourth conical disc 7, these discs being supported on shaft 2. Disk 4 is integrally fixed on a sleeve 8, driven by shaft 1; disc 5 is fixed on sleeve 9, which envelops sleeve 8 and is axially displaceable. The end of sleeve 8 distant from conical disc 4 is connected to an annular piston 10, located in an annular cylinder formed by disc 5, sleeve 9 and an extension 11 at the end of disc 5, radially removed from sleeve 9. Piston 10, sleeve 9, extension 11 and disc 5 surround an annular pressure chamber 12, into which fluid at elevated pressure is held in order to move disc 5 toward disc 4, thereby engaging the bevel surfaces of the drive belt on the surfaces of the discs.

On the secondary shaft, conical disc 6 is integrally fixed on a sleeve 14 driveably connected to shaft 2. A sleeve 15 connected to disc 7 is mounted for axial movement on sleeve 14. A piston 16, fixed to sleeve 14, is located in an annular cylinder formed by sleeve 15, disc 7 and an extension 17 attached to the end of disc 7 that is radially removed from sleeve 15. Piston 16, extension 17, sleeve 15 and disc 7 surround a pressure chamber 18, which communicates through an opening at 19 with a fluid pressure line 21.

Fluid is pumped from sump 23 through gear pump 22 to pressure lines 20 and 21. This fluid is regulated by a suitable device to an optimum pressure in cylinders 12 and 18 to produce the necessary contact forces between the pulleys and the drive belt. Pressure regulation is preferably achieved by a torque sensor 25, which regulates pressure at the outlet of pump 22 to a magnitude controlled as a function of torque transmitted to shafts 1 and 2, the torque sensor being located between the pump and line 24.

The variable displacement pump 29 pumps fluid from cylinder 12 to cylinder 18 and in the reverse direction while being controlled by control signals, which define the conveying direction and steplessly monitors the delivery stream. Pump 29 is located in hydraulic line 28, which connects that portion of line 20 located between opening 13 and check valve 26 to that portion of line 21 located between opening 19 and check valve 27.

An increase in pressure is achieved only if the fluid stream produced by pump 29 is not short-circuited by line 24. The two check valves 26 and 27 allow an increase in pressure and ensure that pressure in the cylinder with the lower pressure can never become lower than pressure in connecting line 24. The purpose of the pressure is to maintain driving contact between the conical pulleys and drive belt.

A constant displacement pump such as a gear pump, can be used instead of a variable displacement pump 29. The fluid stream produced by a gear pump is dependent on speed and is not freely controllable with respect to the direction of fluid flow and volumetric flow rate. It is, therefore, also necessary to provide a valve that reverses and regulates the oil stream delivered by the gear pump 29 as a function of the control signals. This valve is described in more detail with reference to FIGS. 2–7.

Details in FIGS. 2-6, to which reference has been made with respect to the description related to FIG. 1, have the same reference numerals as corresponding components of the assembly shown in FIG. 1.

Fluid delivered at high pressure ($P_{sensor}+P_{front}$) by gear pump 22 is supplied through line 24, check valve 26 and line 20 to the primary-side pressure chamber 12 and through line 24, check valve 27 and line 21 to the secondary-side pressure chamber 18. This pressure produces contact force, dependent on torque, by means of which the primary-side conical discs 4, 5 and the secondary-side conical discs 6, 7 are urged into contact on the beveled surfaces of the drive belt 3. To adjust the transmission ratio, fluid is pumped from the primary-side pressure chamber 12 through line 20, valve 30, gear pump 29', and line 21 into the secondary-side pressure chamber 18 and in the reverse direction by gear pump 29' depending on the state of the reversing and regulating valve 30.

Figure 2:
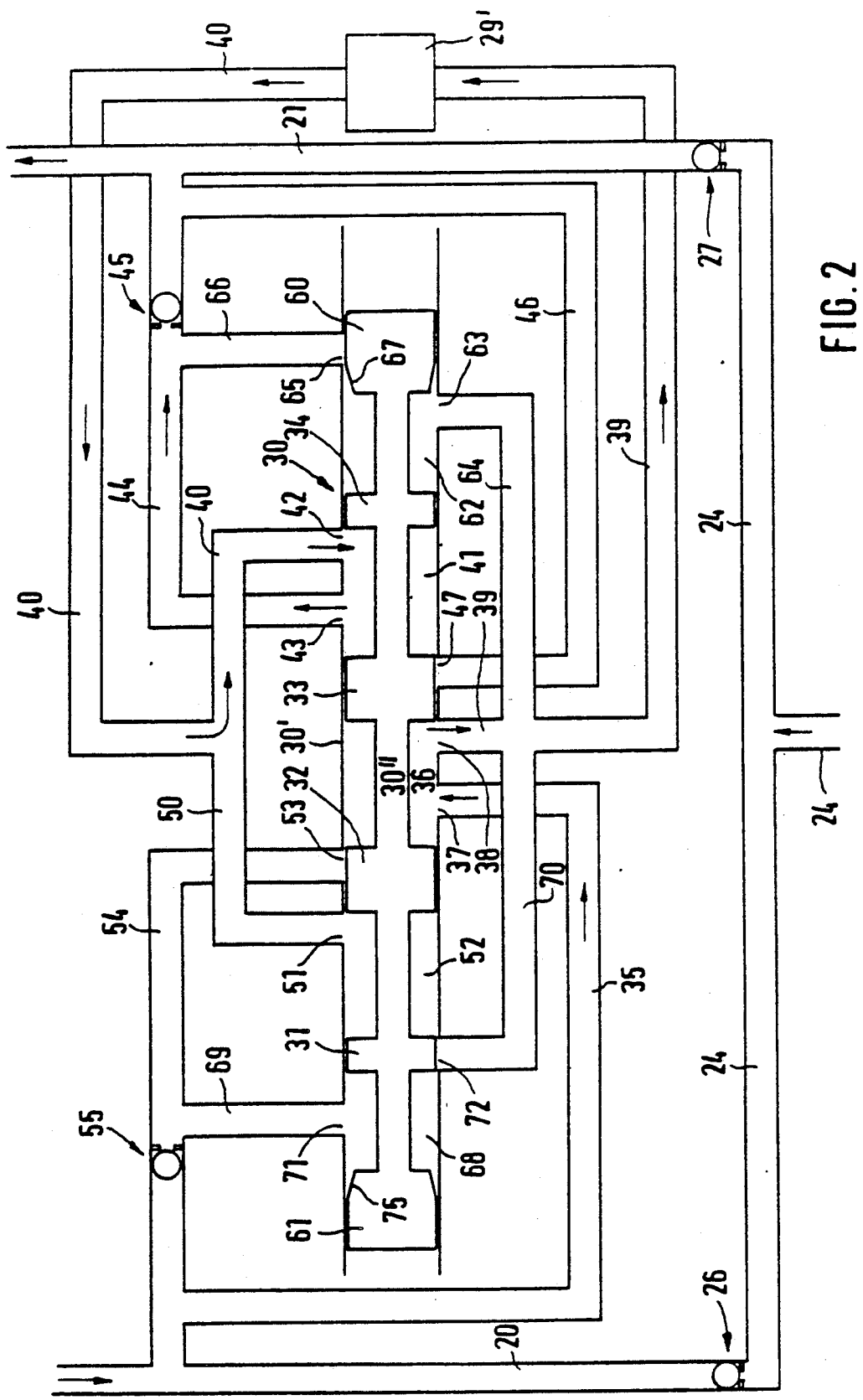
FIGS. 2–7 illustrate operation of hydraulic circuits in accordance with the invention.

As shown in FIG. 2, the spool of valve 30 has four control edges 31–34, the spool moving along a bore formed in housing 30' for reversing the direction of fluid delivered by gear pump 29'.

In FIG. 2, which shows valve 30 in one position, the path from the primary-side pressure chamber 12 to the secondary-side pressure chamber 18 includes a branch in line 20 located between chamber 12 and check valve 26, the branch being connected by pressure line 35 through an opening 37 into chamber 36 located between control edges 32 and 33 of reversing valve 30. Chamber 36 communicates through outlet 38, line 39, gear pump 29', and pressure line 40 to an inlet opening 42 in chamber 41, located between control edges 33 and 34 of the reversing valve. An outlet 43 from chamber 41 is connected by line 44 through check valve 45 to line 21, which leads to the secondary-side pressure chamber 18. Lines 21 and 44 intersect at a point located between chamber 18 and check valve 27. Check valve 45 opens when pressure in chamber 41 is higher than pressure in line 21; otherwise, the valve is closed.

Figure 3:
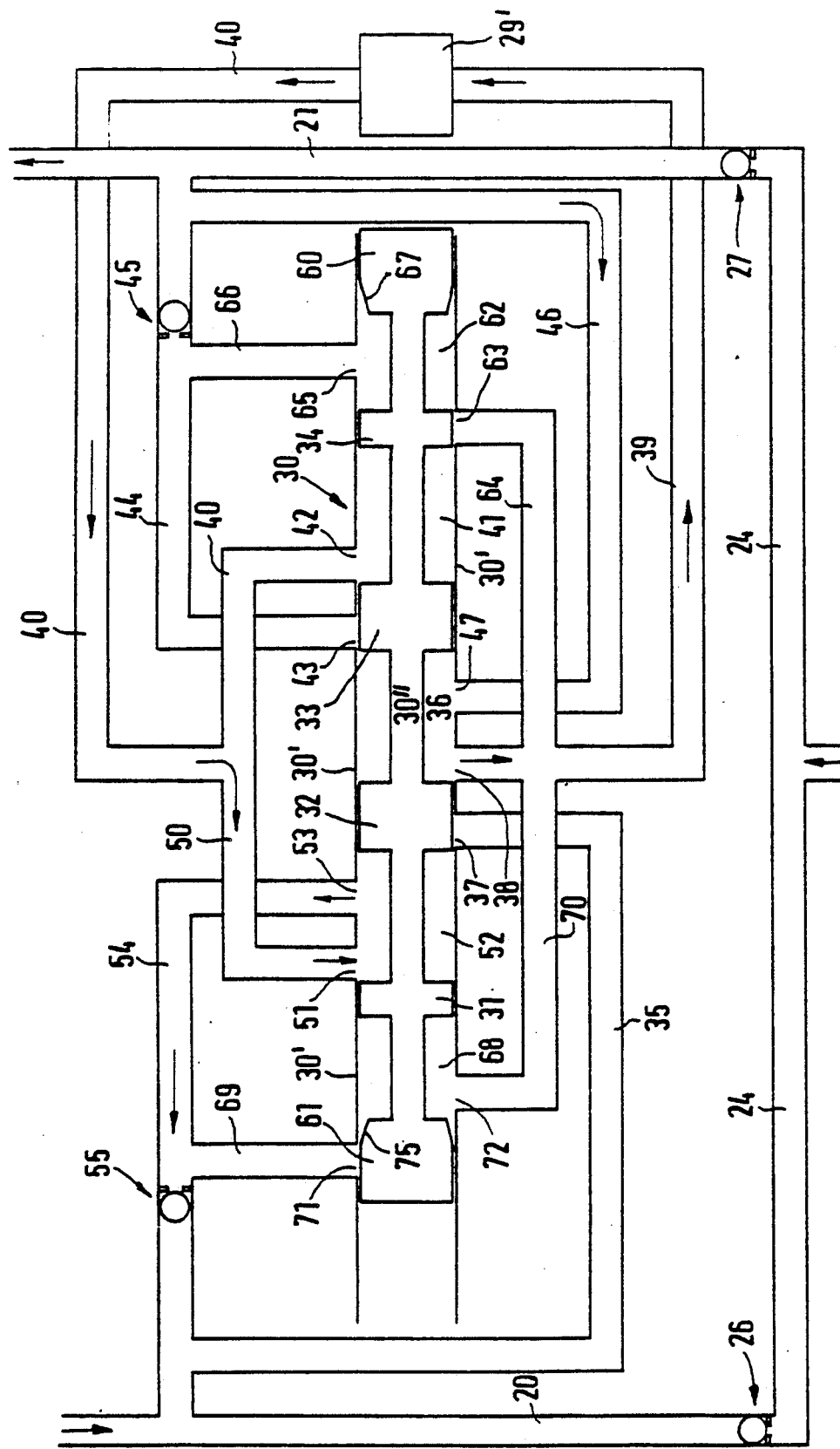

When the state of spool 30" changes to the position of FIG. 3 in order to deliver fluid from chamber 18 to chamber 12, line 46 directs pressure from chamber 18 through line 21 and inlet opening 47 to chamber 36, which is located between control edges 32 and 33 of valve 30. Fluid is conveyed through outlet opening 38, line 39, gear pump 29', lines 40 and 50 and opening 51 into chamber 52 of the reversing valve. Fluid passes through outlet 53, line 54, check valve 55 into line 20 and primary-side pressure chamber 12. Chamber 52 is located between the control edges 31 and 32 of the reversing valve.

Check valve 55 opens when pressure in line 54 is greater than pressure in chamber 12; otherwise, the valve is closed.

When valve 30 is in the position shown in FIG. 2, control edge 32 closes opening 53, thus closing the path from chamber 52 through line 54 to chamber 12. Control edge 33 closes opening 47 so that the path from chamber 36 through line 46 is closed. When valve 30 is in the position shown in FIG. 3, control edge 32 closes opening 37 so that the path from chamber 36 through line 35 to line 20 is closed, and control edge 33 closes opening 43 so that the path from chamber 41 through line 44 to line 21 is closed.

During the adjusting process, pump 29' delivers fluid at a flow rate sufficient to adjust the conical pulley discs. Therefore, in addition to a freely selectable flow direction, the flow rate must be regulated steplessly. Maximum flow rate results from maximum speed of adjustment required in a particular application. Minimum flow rate is that flow rate required to keep the pressure difference pertaining to the respective transmission ratio between cylinders 12 and 18 after adjustment.

Gear pump 29' delivers fluid at a flow rate that is proportional to engine speed. In order to make the flow rate proportional to control signals, valve 30 is enlarged in a manner described in more detail hereinafter, such that it produces flow division controlled by signal S, by a method which differs from known flow dividers and functions without adversely affecting efficiency. Power drawn by gear pump 29' is proportional to the product of pressure multiplied by volumetric flow. For reasons of efficiency, power should only be produced as actually required, i.e., according to requirements for additional power to adjust and extend beyond application power.

Therefore, instead of regulating the entire output of gear pump 29' to a necessary pressure and then reducing excess capacity, the delivery stream is regulated with a switching ratio, which is steplessly variable between 0% and 100% or is returned without pressure (and therefore without power) back to the suction side of the pump. The controlled flow rate is then proportional to the mean value over time of the flow rate in the ON state (FIG. 2) and the flow rate in the OFF state (FIG. 4) and is therefore proportional to the externally controlled switching ratio. The power required is the adjusted flow rate multiplied by impact pressure instead of flow rate capacity times impact pressure. Improved efficiency follows from this.

Figure 4:
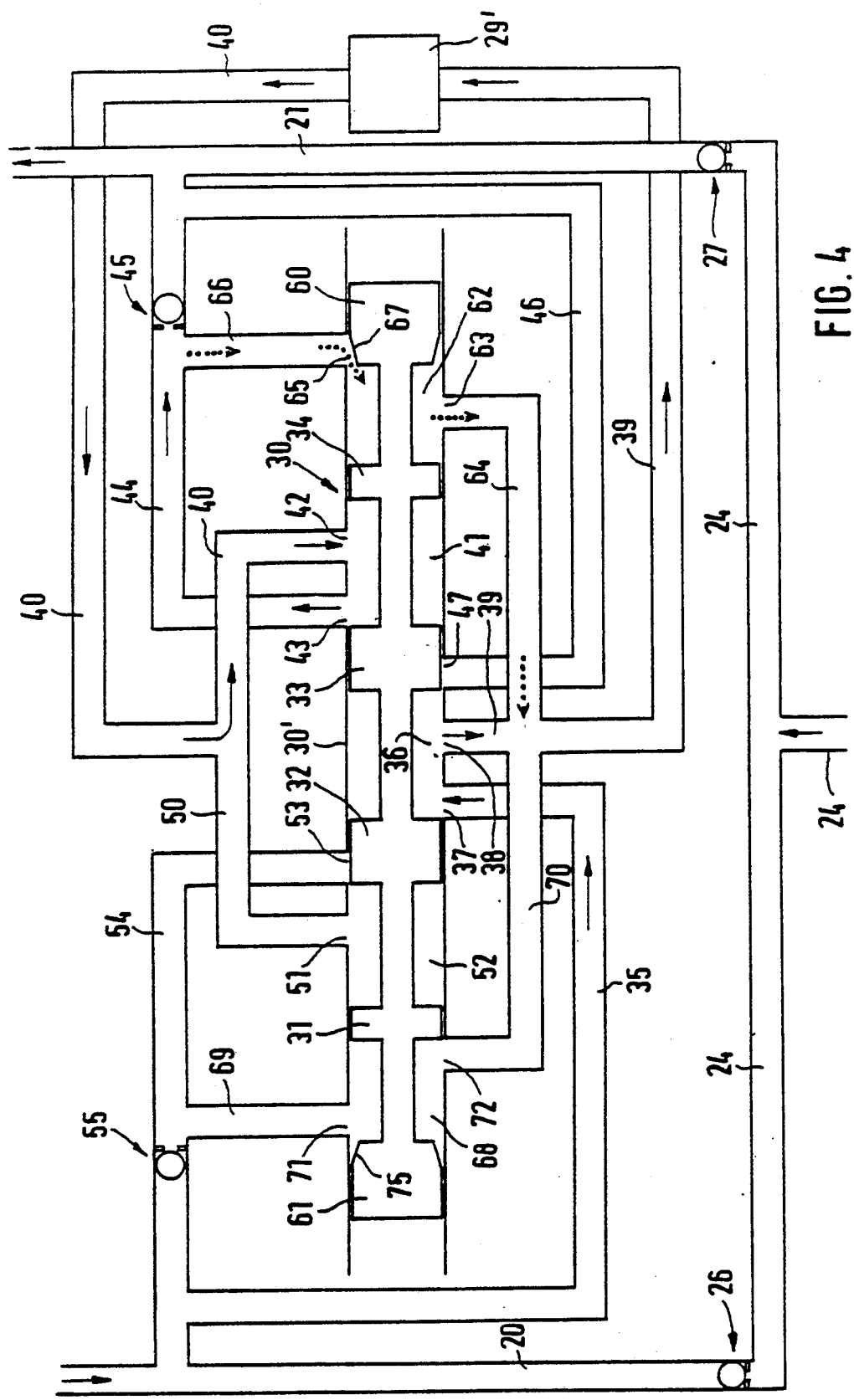

For this purpose, valve 30 is provided with control edges 60 and 61. Referring now to FIG. 4, in order to direct fluid into pressure chamber 18, control edge 34 and control edge 60 define a chamber 62 therebetween. A port 63 communicates through lines 39 and 64 with the suction side of gear pump 29'. When the valve is in the first position shown in FIG. 2, control edge 60 closes space 62 at port 65 and lines 44 and 66 to the delivery side of gear pump 29'.

In contrast to the back pressure at pump 29', pressure in chambers 12 and 18 must not pulsate; therefore, check valves 55 and 45 are required. At the beginning of the ON phase (FIG. 2), pressure in lines 66 and 69 rises rapidly from virtually zero pressure until those pressures are higher than pressure in chamber 12 or 18. At that instant, the fluid stream delivered by pump 29' flows into the respective pressure chamber 12 or 18 (pump back pressure being equal to the pressure in pressure chamber 12 or 18).

Thereafter, pressure in chamber 12 or 18 rises relatively slowly until the next OFF phase (FIG. 4) begins. Then, pressure in lines 66 and 69 collapses rapidly, while check valves 55 and 45 ensure that pressure in chamber 12 or 18 drops only slowly, a consequence of oil leakage of the cylinder. Pressure in the pressure chamber with the higher pressure is superimposed by pressure modulation, which is small enough with respect to the mean pressure to avoid impairing operation. The switching frequency should be selected such that each OFF phase is short enough to guarantee that pressure in chamber 12 or 18 remains practically constant.

The switching ratio between the first and second location is preferably adjusted by a pulse-width-modulated ON/OFF valve (not shown), which shifts the valve spool and therefore control edge 60 of valve 30 between the first and second locations. The ON/OFF valve is controlled by an electronic control system.

To avoid acoustic excitation of the gear casing, a conical taper 67, which prevents an abrupt rise in pressure during the changeover between the first and second locations, is preferably provided at the control edge 60.

Displacement of spool 30" of reversing valve 30 between a first location (FIG. 3) and a second location (FIG. 5) occurs also when fluid flows from chamber 18 into chamber 12. Control edge 61 defines with edge 31 a chamber 68 having an port 72 communicating through lines 70 and 39 with the suction side of pump 29'. With valve 30 in the first location (FIG. 3), control edge 61 closes communication between chamber 68 and the delivery side of the pump through entrance 71 and line 69. With spool valve 30 in the first location, pressure at the delivery side of the pump rapidly rises to the magnitude at which check valve 55 opens and is conveyed into chamber 12.

Figure 5:
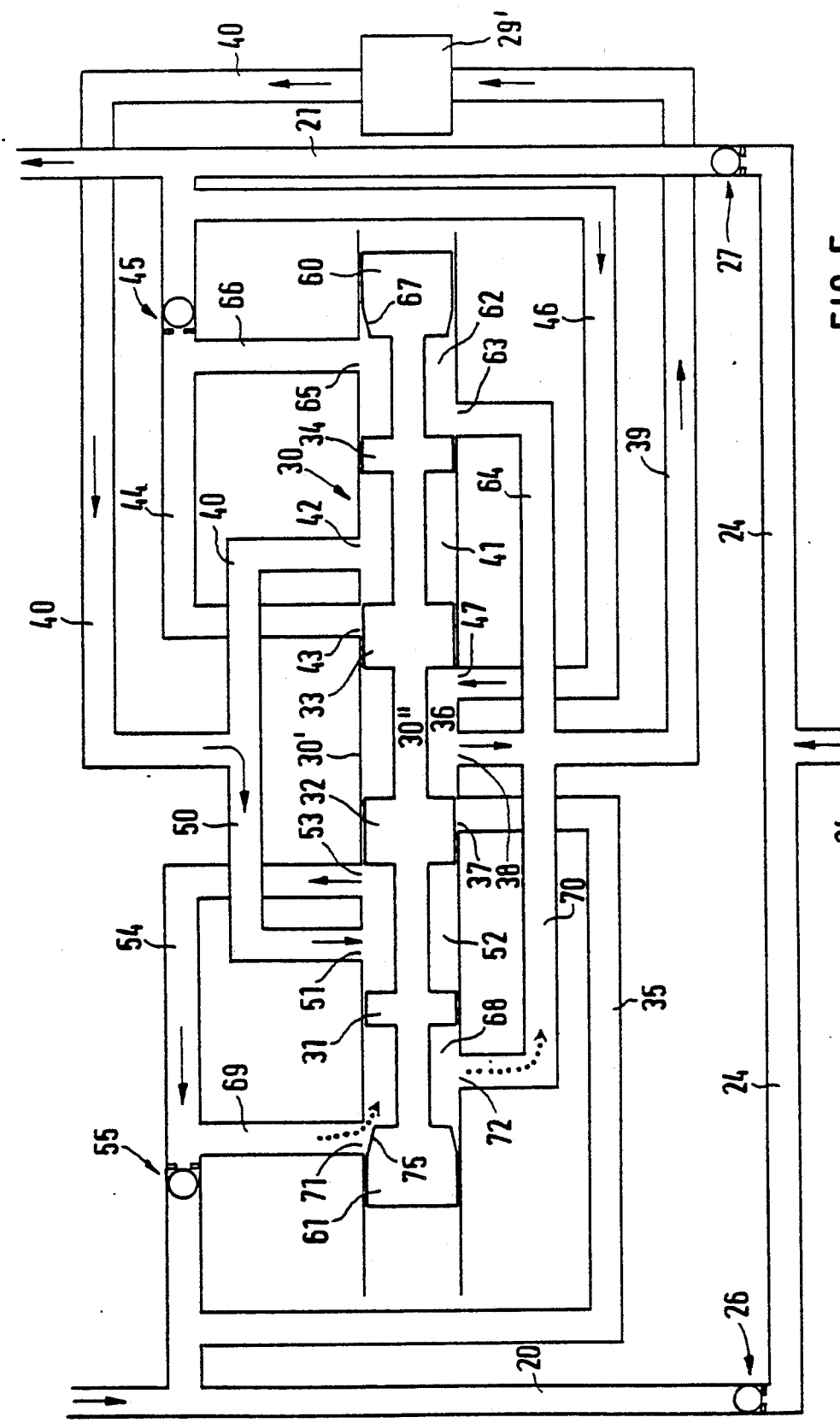

With valve 30 in the OFF position (second location) as FIG. 5 shows, entrance 71 is opened by control edge 61 so that the delivery side of the pump communicates through lines 40, 50, 54 and 69, chamber 68 and lines 70 and 39 to the suction side of the pump. Fluid is pumped through this circuit without pressure and without power. Due to switching displacement of valve spool 30" between ON and OFF positions when fluid is pumped from chamber 18 to chamber 12, the above-mentioned advantages result. Switching displacement occurs because of operation of the pulse-width-modulated ON/OFF valve (not shown). To avoid acoustic excitation of the gear housing, conical taper 75, which prevents an abrupt rise of pressure during a change between the first and second locations, is preferably also provided on control edge 61.

Figure 6:
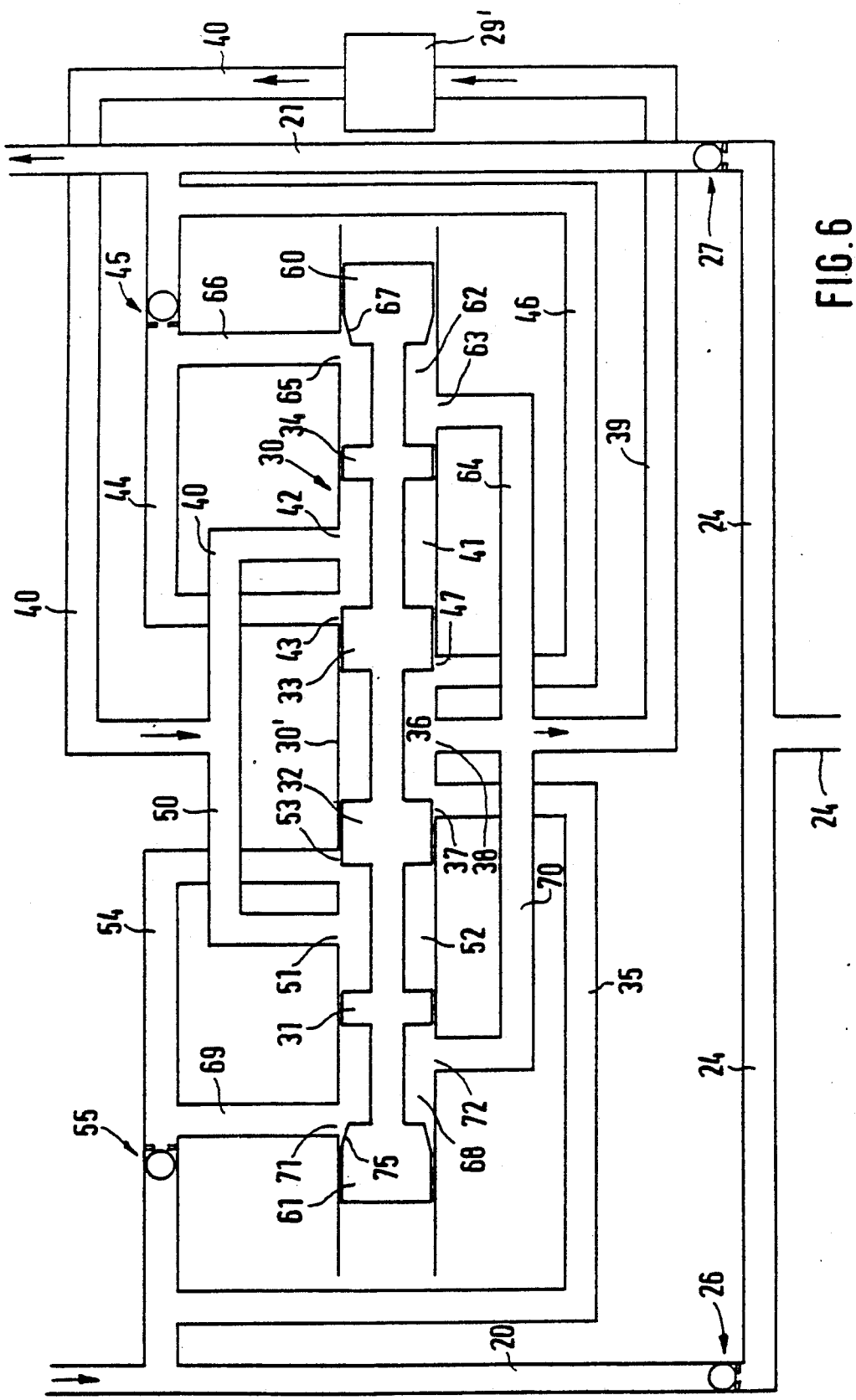

FIG. 6 shows a transient intermediate position, in which valve 30 is located centrally between the two fluid conveying positions. This state occurs only during a change of the flow direction and should be passed through very rapidly.

Figure 7:
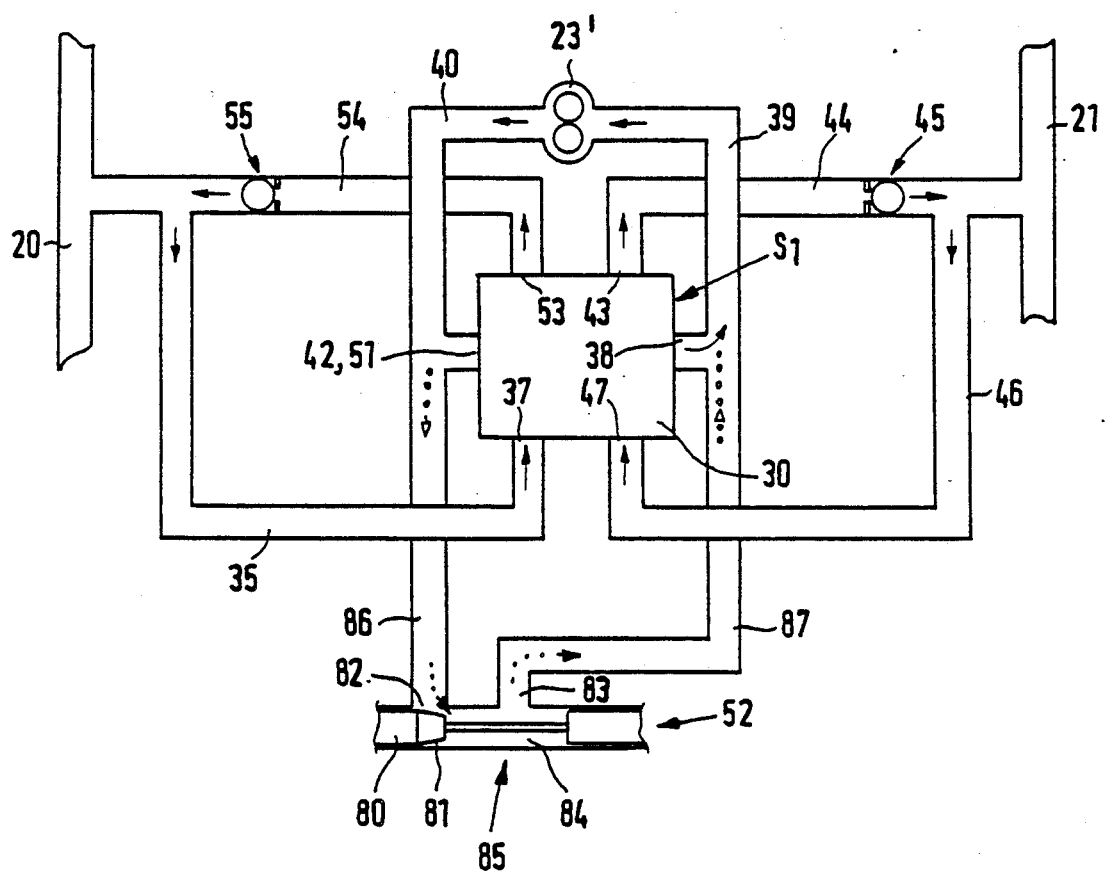

Development of the transmission ratio control of the present invention is next described with reference to FIG. 7, in which a reversing and regulating valve corresponds to valve 30 but has control edges 60 and 61, chambers 62, 68 and lines 66, 64, 69 and 70 absent. In order to allow pressure-free and power-free return of the fluid delivered by gear pump 29' to the suction side, regulating valve 85 is provided. Through operation of valve 85, the delivery side of the pump is connected to the suction side. Regulating valve 85 is switched by a signal S2, as already described with reference to the switching of valve body 30" between the two locations. More precisely, valve 85 has a chamber 84, which has an opening 82 connected to line 86 leading to the delivery side and an opening 83 connected to line 87 leading to the suction side. A control edge 80 slides between the two locations and closes opening 82 when in the first location so that the delivered fluid flow stream cannot be returned. Edge 80 opens opening 82 when in the second location so that opening 82 is connected through chamber 84 to opening 83. This action causes a fluid stream delivered by the pump to be returned to the suction side through line 87. Control edge 80 also has a taper 81, similar in function and form to tapers 67 and 75 formed on spool 30". The first and second location of valve 85 corresponds in operation to the described first and second locations of control edges 60 and 61. Control edge 80 can be placed at opening 83 instead of at opening 82.

I claim:

1. A system for controlling the transmission ratio of a stepless continuously variable transmission, comprising:
 a first shaft rotatably supporting first and second conical discs, at least one of said discs being axially displaceable on the first shaft to change the axial spacing between said discs;
 a second shaft substantially parallel to the first shaft, rotatably supporting first and second conical discs thereon, at least one of said discs being axially displaceable on the second shaft to change the axial spacing between said discs;

an endless drivebelt drivably engaging the discs of the first and second shafts at a position on the discs that varies in accordance with the spacing therebetween;

first and second pressure chambers;

a source of pressurized hydraulic fluid;

first passage means connecting the pressure source and the first and second pressure chambers;

first check valve means located in the passage means between the first pressure chamber and the pressure source for opening and closing communication between the first pressure chamber and the pressure source in accordance with the pressure differential therebetween;

second check valve means located in the passage means between the second pressure chamber and the pressure source for opening and closing communication between the second pressure chamber and the pressure source in accordance with the pressure differential therebetween;

pumping means having variable displacement for pumping fluid between the first pressure chamber and the second pressure chamber; and second passage means connecting the pumping means to the first and second pressure chambers.

2. The system of claim 1 wherein the second passage means is connected to the first passage means between the first check valve and the first pressure chamber and the second passage means is connected to the first passage means between the second check valve and the second pressure chamber.

3. A system for controlling the transmission ratio of a stepless continuously variable transmission, comprising:

a first shaft rotatably supporting first and second conical discs, at least one of said discs being axially displaceable on the first shaft to change the axial spacing between said discs;

a second shaft substantially parallel to the first shaft, rotatably supporting first and second conical discs thereon, at least one of said discs being axially displaceable on the second shaft to change the axial spacing between said discs;

an endless drivebelt drivably engaging the discs of the first and second shafts at a position on the discs that varies in accordance with the spacing therebetween;

first pressure chamber means for changing the spacing between the discs of the first shaft in accordance with the pressure in said first chamber means;

second pressure chamber means for changing the spacing between the discs of the second shaft in accordance with the pressure in said second chamber means;

a first pumping means for supplying fluid;

first passage means connecting the first pumping means and the first and second pressure chambers;

first check valve means located in the passage means between the first pressure chamber means and the first pumping means for opening and closing communication between the first pressure chamber means and the first pumping means in accordance with the pressure differential therebetween;

second check valve means located in the passage means between the second pressure chamber means and the first pumping means for opening and closing communication between the second pressure chamber means and the first pumping means in accordance with the pressure differential therebetween;

second pumping means having an inlet and an outlet for pumping fluid therebetween;

second passage means connecting the outlet of the second pumping means to the first pressure chamber means and second pressure chamber means; and valve means located in the second passage means for reversing the flow direction, between the first pressure chamber means and the second pressure chamber means, of fluid pumped by the second pumping means.

4. The system of claim 3, further comprising valve means for closing the second passage means and for directing fluid flow from the outlet of the second pumping means to the inlet of the second pumping means.

5. The system of claim 3 wherein the valve means includes a spool displaceable between a first position where the first pressure chamber means is connected to the inlet of the second pumping means and the outlet of the second pumping mean is connected to the second pressure chamber means, and a second position where the second pressure chamber means is connected to the inlet of the second pumping means and the outlet of the second pumping means is connected to the first pressure chamber means.

6. The system of claim 5 wherein the valve means comprises:

a first entrance connected to the first pressure chamber means;

a second entrance connected to the inlet of the second pumping means;

a third entrance connected to the second pressure chamber means;

a spool having first and second edges defining a first chamber therebetween, the first chamber connecting the first entrance and second entrance mutually when the valve spool is in the first position and connecting the second entrance and third entrance mutually when the valve spool is in the second position, the second edge closing the third entrance when the valve spool is in the first position, the first edge closing the first entrance when the valve spool is in the second position;

a fourth entrance connected to the second pressure chamber means;

a fifth entrance connected to the outlet of the second pumping means;

a second chamber connecting the fourth entrance and fifth entrance mutually when the valve spool is in the first position, the second edge closing the fourth entrance when the valve spool is in the second position;

third check valve means located between the fourth entrance and the second pressure chamber means for opening and closing communication between the second pressure chamber means and the fourth entrance in accordance with the pressure differential therebetween;

a sixth entrance connected to the outlet of the second pumping means;

a seventh entrance connected to the first pressure chamber means;

a third chamber connecting the sixth entrance and seventh entrance mutually when the valve spool is in the second position, the first edge closing the seventh entrance when the valve spool is in the first position; and fourth check valve means located between the seventh entrance and the first pressure chamber means for opening and closing communication between the first pressure chamber means and the seventh entrance in accordance with the pressure differential therebetween.

7. The system of claim 3 wherein the valve means includes a spool displaceable between a first position where the first pressure chamber means is connected to the inlet of the second pumping means and the outlet of the second pumping means is connected to the second pressure chamber means, and a second position where the second pressure chamber means is connected to the inlet of the second pumping means and the outlet of the second pumping means is connected to the first pressure chamber means; and the spool is displaceable between a first location where the first pressure chamber means is connected to the inlet of the second pumping means and the outlet of the second pumping means is connected to the inlet of the second pumping means, and a second location where the second pressure chamber means is connected to the inlet of the second pumping means and the outlet of the second pumping means is connected to the inlet of the second pumping means.

8. The system of claim 7 wherein the valve means further comprises:

an eight entrance connected to the inlet of the second pumping means;

a ninth entrance connected to the fourth entrance between the third check valve means and the fourth entrance;

a fifth chamber located between the fourth edge and sixth edge;

a tenth entrance communicating with the fifth chamber, connected to the seventh entrance between the second check valve means and the seventh entrance;

an eleventh entrance connected to the inlet of the second pumping means; and a spool having a fourth edge, a fifth edge and sixth edge, the spool defining a fourth chamber between the third edge and the fifth edge, the fifth edge closing the ninth entrance when the valve spool is in the first position and first location, the fifth edge opening the ninth entrance to the inlet of the second pumping means through the eight entrance and the fourth chamber when the valve spool is in the first position and second location, the sixth edge closing the tenth entrance when the valve spool is in the second position and first location, and the sixth edge opening the tenth entrance to the inlet of the second pumping means through the eleventh entrance and the fifth chamber when the valve spool is in the second position and second location.

9. The system of claim 8 in which the fifth edge and sixth edge each have a conical bevel surface providing a gradual transition at an end of the fifth edge and sixth edge, the fifth edge and sixth edge closing the ninth entrance and the tenth entrance, respectively, when the valve spool is in the first location, the conical bevel edge of the fifth edge and sixth edge opening the ninth entrance and tenth entrance, respectively, when the valve spool is in the second location.

* * * * *